United States Patent [19]

Fussnegger et al.

[11] Patent Number: 4,842,318

[45] Date of Patent: Jun. 27, 1989

[54] MOTOR CAR SEAT GUIDE RAIL SUPPORT SYSTEM

[75] Inventors: Wolfgang Fussnegger, Horb-Betra; Egon Rieth, Boeblingen; Antonin Koucky, Sindelfingen; Bernd Hector, Neuhengstett, all of Fed. Rep. of Germany

[73] Assignee: Daimler-Benz Aktiengesellschaft, Stuttgart, Fed. Rep. of Germany

[21] Appl. No.: 128,416

[22] Filed: Dec. 3, 1987

[30] Foreign Application Priority Data

Dec. 3, 1986 [DE] Fed. Rep. of Germany ....... 3641294

[51] Int. Cl.[4] .............................................. B60N 1/02

[52] U.S. Cl. .................................... 296/65.1; 248/430

[58] Field of Search ............. 296/65 R; 248/393, 429, 248/430; 297/325, 324, 344

[56] References Cited

U.S. PATENT DOCUMENTS

| | | | |
|---|---|---|---|
| 4,395,011 | 7/1983 | Torta | 296/65 R |
| 4,515,404 | 5/1985 | Nishimura et al. | 296/65 R |
| 4,756,503 | 7/1988 | Fujita | 296/65 R |

FOREIGN PATENT DOCUMENTS

| | | | |
|---|---|---|---|
| 3018811 | 11/1981 | Fed. Rep. of Germany . | |
| 3419854 | 12/1984 | Fed. Rep. of Germany | 296/65 R |
| 2090127 | 7/1982 | United Kingdom . | |

*Primary Examiner*—Robert R. Song

*Attorney, Agent, or Firm*—Barnes & Thornburg

[57] ABSTRACT

In a longitudinally slidable motor car seat, the slide rail system of which comprises a guide rail and running rail, for an improved transmission of powerful forces without local overloading, the guide rail is accommodated by a channel open towards the motor car seat and shaped out of the material of the tunnel and/or of the sill. The guide rail is provided with a flange abutting the descending inner sill wall and exhibiting terminally a cranked part behind which a part connected to the motor car seat engages.

11 Claims, 1 Drawing Sheet

MOTOR CAR SEAT GUIDE RAIL SUPPORT SYSTEM

BACKGROUND AND SUMMARY OF THE INVENTION

The invention relates to a motor car seat longitudinally slidable in a slide rail support system of the type consisting of a guide rail and a running rail, wherein the slide rail is accommodated on the vehicle centre tunnel side and/or the vehicle door sill side. The running rail is accommodated by means of a channel in the slide rail which is open towards the motor car seat and shaped out of the material of the tunnel and/or of the sill.

Such a slide rail arrangement, through which—without inadmissible deformation phenomena—high forces can be transmitted into the vehicle body in the case of a collision, is described in German Published Patent Application (DE-OS) 3,018,811. In order to ensure the required easy mobility, the running rail exhibits at the top a slight gap from the adjacent channel wall, which upon a corresponding transmission of force must first be eliminated in order that an areal transmission of force can occur. Because the gap width may differ due to unavoidable tolerances, the danger exists that during the distortion phenomenon of the slide rail which is necessary to eliminate the gap, local overload may occur particularly in the region of the fastening points of the guide rail, due to which the secure retention of the guide rail ceases to be ensured.

It is an object of the invention to improve the arrangement and construction of the slide rail so that a reliable transmission of force is obtained at a high force level and local force peaks are reliable avoided.

This object is achieved by providing that the fixed guide rail exhibits a downwardly extending flange which abuts the adjacent vehicle sill/tunnel wall structure and exhibits a cranked part at its bottom extremity which is engageable from behind by a part connected for movement with the seat.

The part which engages behind forms a constituent of the running slide rail according to certain preferred embodiments. This part is formed by a section of the seat frame according to other preferred embodiments.

Powerful forces directed towards the seat can be braced when the guide rail is provided with stops for the slide rail according to certain preferred embodiments.

Other objects, features and advantages of the present invention will become more apparent from the following description when taking with the accompanying drawings which show, for purposes of illustration only, an embodiment in accordance with the present invention.

DETAILED DESCRIPTION OF THE DRAWINGS

Figure 1:
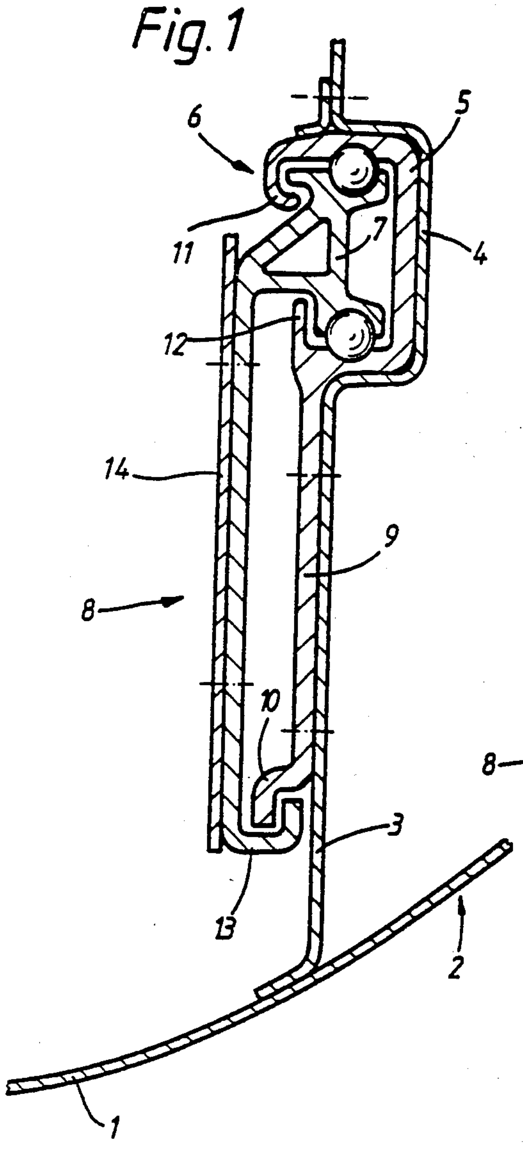
FIG. 1 is a partial schematic sectional view of a slide rail mounting on a vehicle sill side with a bracing flange projecting downwards from the running rail in accordance with a first preferred embodiment of the invention.

A vehicle floor 1 of a motor vehicle that is not shown in detail, laterally changed over into a sill 2 that has an inner sill wall 3 that projects upward approximately in the vertical direction and into which a channel 4 is molded. This channel 4 is lined by the guide rail 5 of a slide rail system 6, the running or sliding rail 7 of which is connected to a part 8 of the motor vehicle seat that is not shown. Resting against the sill wall 3 and locally fixed to it, a flange 9 that is connected in one piece with the guide rail 5 extends downward and ends in a cranked part 10. Stops 11 and 12 that are molded onto the guide rail 5 result in a supporting effect for the running rail 7 when a force is directed to the center of the vehicle.

According to FIG. 1, a part 13 that projects downward from the running rail 7 reaches behind the crank part 10. This part 13 is firmly connected with part 8 that, in a way that is not shown in detail, is developed as a section of a seat frame 14.

Figure 2:
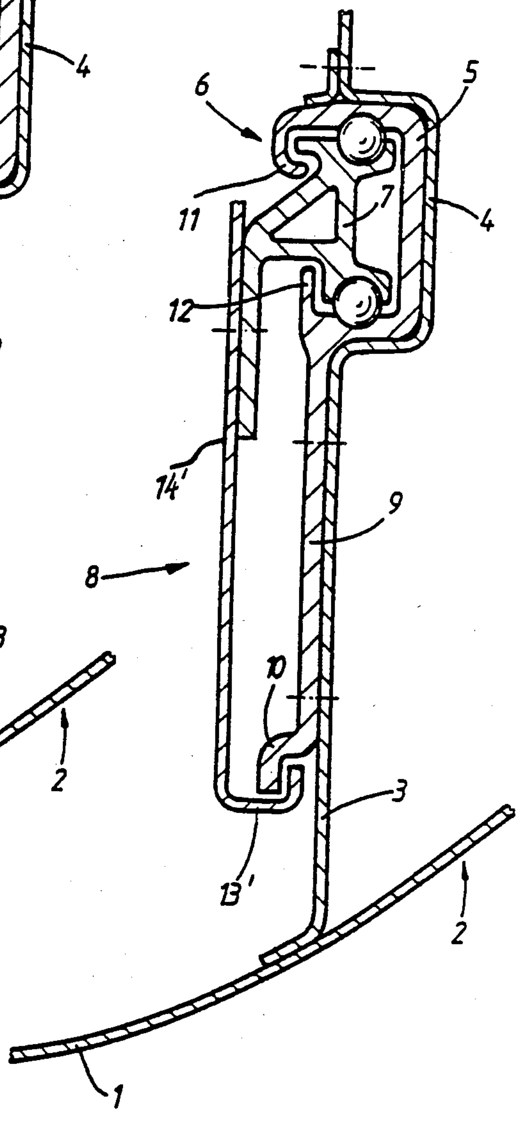
FIG. 2 is a view similar to FIG. 1, but showing a second preferred embodiment of the invention, wherein the bracing flange is formed by a seat frame section.

As shown in FIG. 2, the part 13' that reaches behind the cranked part 10 forms a section of the seat frame 14' so that in both cases (FIGS. 1 and 2), in the case of an effect of force that is caused by an accident, a secure introduction of force takes place. Particularly advantageous in both embodiments is the direct introduction of force from the running rail 7, via the guide rail 5, to the channel 4 and thus to the sill without prior deformation phenomena at the slide rail 6.

Although the present invention has been described and illustrated in detail, it is to be clearly understood that the same is by way of illustration and example only and is not to be taken by way of limitation. The spirit and scope of the invention are to be limited only by the terms of the appended claims.

What we claim is:

1. Motor car seat support system comprising:

a relatively fixed guide rail exhibiting a channel opening toward a movable vehicle seat, a slide rail fixedly connected to the movable vehicle seat and slidably supported in said channel, a flange member extending downwardly from the channel and connected to a vehicle body support wall of the vehicle, a lower portion of said flange member exhibiting a cranked part, and a part connected to the movable car seat which engages behind the cranked part whereby forces directed toward the seat are reliably transmitted to the vehicle body support wall.

2. Motor car seat support system according to claim 1, wherein the part connected to the movable car seat forms a constituent of the slide rail.

3. Motor car seat support system according to claim 1, wherein the part connected to the movable car seat is formed by a section of a seat frame.

4. Motor car seat support system according to claim 1, wherein the guide rail is provided with stops for the slide rail.

5. Motor car seat support system according to claim 1, wherein the vehicle body support wall is part of a sill extending upwardly from the vehicle body floor at a lateral outer edge of the vehicle.

6. Motor car seat support system according to claim 1, wherein the vehicle body support wall is part of a centrally disposed vehicle tunnel structure.

7. Motor car seat support system according to claim 1, wherein the cranked part exhibits two right angle bends to form a downwardly open U-shape in conjunction with the vehicle body support wall, and wherein the part connected to the movable car seat extends into the U-shape.

8. Motor car seat support system according to claim 7, wherein the vehicle body support wall is part of a sill extending upwardly from the vehicle body floor at a lateral outer edge of the vehicle.

9. Motor car seat support system according to claim 7, wherein the vehicle body support wall is part of a centrally disposed vehicle tunnel structure.

10. Motor car seat support system according to claim 7, wherein the part connected to the movable car seat forms a constituent of the slide rail.

11. Motor car seat support system according to claim 1, wherein the part connected to the movable car seat is formed by a section of a seat frame.

* * * * *